B. M. SMITH.
STORAGE BATTERY TRUCK.
APPLICATION FILED NOV. 21, 1911.
1,067,625. Patented July 15, 1913.
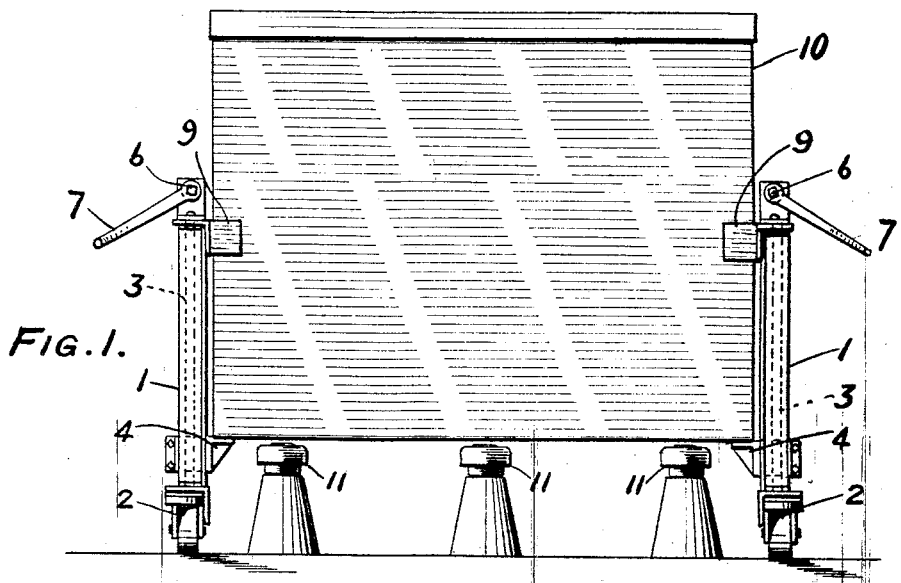
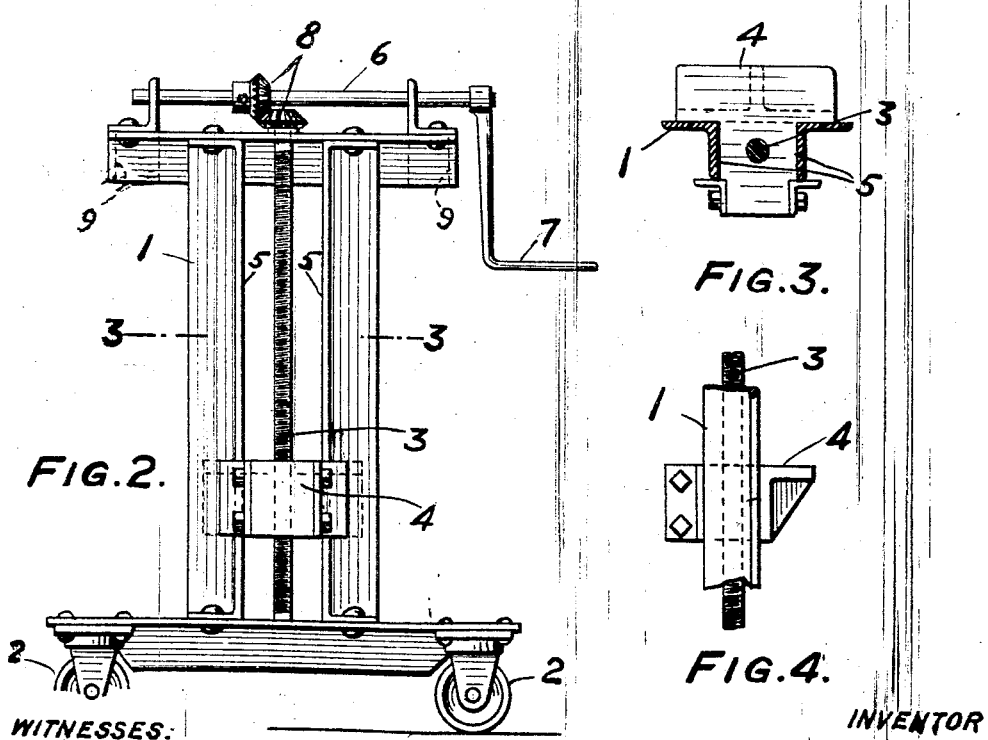
WITNESSES:
INVENTOR
Benjamin M. Smith
BY
Augustus B. Stoughton.
ATTORNEY

UNITED STATES PATENT OFFICE.

BENJAMIN M. SMITH, OF CLEVELAND, OHIO.

STORAGE-BATTERY TRUCK.

1,067,625.  Specification of Letters Patent.  Patented July 15, 1913.

Application filed November 21, 1911. Serial No. 661,598.

*To all whom it may concern:*

Be it known that I, BENJAMIN M. SMITH, a citizen of the United States, and a resident of Cleveland, in the county of Cuyahoga and State of Ohio, have invented a certain new and useful Storage-Battery Truck, of which the following is a specification.

The principal object of the present invention is to provide an appliance by means of which few, even two, men can lift a storage battery tank to or from its insulating supports and, if necessary, move it about from place to place.

The invention will be claimed at the end hereof, but will be first described in connection with the embodiment of it chosen for illustration in the accompanying drawings, in which—

Figure 1, is a side view illustrating a pair of devices embodying the invention, in application to a storage battery tank. Fig. 2, is a rear view of one of the devices drawn to a somewhat enlarged scale. Fig. 3, is a sectional view taken on the line 3—3 of Fig. 2, and Fig. 4, is a side view of one of the lifting feet.

In the drawings 1, is a standard mounted upon casters or wheels 2. The standard is provided with a lifting screw 3 which is revolubly mounted in it. The screw 3 engages a thread opening in a lifting foot 4, slidably mounted in ways 5, formed in the standard.

6, is a crank shaft applied to the standard and provided with a hand-crank 7. Interposed between the shaft 6 and screw 3 are bevel gears 8.

9, are arms which project from the top of the standard in the same direction that the foot projects.

In use the foot 4 is adjusted to the proper height by turning the hand crank 7 which revolves the screw 3 for permitting the foot to be inserted under the tank 10. When two of the devices have been adjusted in this way to opposite ends of the tank, the latter can be lifted from its insulators 11 by turning the cranks 7 and thus raising the feet. The arms 9 being at the opposite sides of the tank serve to guide the tank in respect to the standards. When the tank has thus been raised, it can be easily moved by pushing the standards which run on the rollers or casters 2. Similarly the tank can be mounted on the feet, wheeled to place over the supporters and then lowered onto the supporters. Some storage battery tanks are heavy and would require a number of men to transport them and place them on or take them off their supporters, but by means of the described appliances two men can easily do the work that formerly required a number of men.

What I claim is:

A device for raising, lowering and transporting storage battery tanks which comprises the combination of a standard provided with ways and with parallel laterally extending arms and mounted on casters, a lifting screw carried by the standard, a foot movable in the ways and engaged by the screw, a crank shaft extending beyond the arms and there provided with a crank handle, and gearing for turning the screw, substantially as described.

In testimony whereof I have hereunto signed my name in the presence of witnesses.

B. M. SMITH.

Witnesses:
J. W. FRASER,
G. P. KOELLIKER.